United States Patent
Huang

(10) Patent No.: US 6,935,031 B1
(45) Date of Patent: Aug. 30, 2005

(54) GEAR-DRIVEN SHEARS PROVIDED WITH A CURVED PLATE ON A MOVABLE JAW

(75) Inventor: Chin-Chi Huang, Chang Hua Hsien (TW)

(73) Assignee: Hung Chuan Hsian Industries Co., Ltd., Chang Hua Hsien (TW)

( * ) Notice: Subject to any disclaimer, the term of this patent is extended or adjusted under 35 U.S.C. 154(b) by 0 days.

(21) Appl. No.: 10/771,316

(22) Filed: Feb. 5, 2004

(51) Int. Cl.$^7$ .............................................. B26B 13/00
(52) U.S. Cl. ........................................ 30/250; 30/249
(58) Field of Search ......................... 30/186, 187, 188, 30/192, 193, 244, 245, 249, 250

(56) References Cited

U.S. PATENT DOCUMENTS

| | | | | |
|---|---|---|---|---|
| 107,577 A | * | 9/1870 | Will ............................. | 30/250 |
| 508,022 A | * | 11/1893 | Kamphaus .................... | 30/250 |
| 3,210,844 A | * | 10/1965 | Tontscheff .................... | 30/250 |
| 4,677,748 A | * | 7/1987 | Kobayashi .................... | 30/250 |
| 4,779,342 A | * | 10/1988 | Kobayashi et al. ........... | 30/250 |
| 6,260,277 B1 | * | 7/2001 | Wu ............................... | 30/232 |
| 6,681,492 B1 | * | 1/2004 | Huang ........................... | 30/250 |

* cited by examiner

Primary Examiner—Hwei-Siu Payer
(74) Attorney, Agent, or Firm—Alan D. Kamrath; Nikolai & Mersereau, P.A.

(57) ABSTRACT

Gear-driven shears include two grips, the fixed jaw, and the movable jaw and gear wheel module. The fixed jaw and the first grip are connected together at a joint of plate assembly module. The corresponding ends of movable jaw and the second grip are installed on the first pivot axle and second pivot axle of the plate assemble module. The characteristic of the invention is that one curved plate is installed additionally on one side of the movable jaw. Its first end is also installed on the first pivot axle of the plate assembly module sharing the same rotating point with the movable jaw. Meanwhile it is installed on the first edge of the curved plate together with the first tooth edge of the movable jaw. The second edge of the curved plate is equipped with wedge, which is locked in the notch on one side of the movable jaw. The middle section of curved plate is made into a curve.

3 Claims, 5 Drawing Sheets

GEAR-DRIVEN SHEARS PROVIDED WITH A CURVED PLATE ON A MOVABLE JAW

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to gear-driven shears, and more particularly to gear-driven shears which have a movable jaw provided with a curved plate.

BACKGROUND OF THE INVENTION

This invention is the improvement based on the prior shear structure, especially the gear-drive shear. The characteristic of this shear structure differs from the general shear in that the movable jaw is not connected with driving grip, but by means of gear wheel module's inter-meshing so as to have an advantage in saving labor and splaying more easily and efficiently.

The defects of the prior structure in practice are as follows:

1. One end of the movable jaw is rotating by means of gear's meshing with the gear wheel module. This structure is lack of flexibility despite the character of toughness because the movable jaw is made of hard steel as a whole. Therefore when trimming sticks, it is easier to cause a troublesome problem of being blocked off no matter when it is closing or opening.

2. One end of the corresponding grip of the movable jaw must be in the gear shape. It must be made of hard steel because the movable jaw should have a function of cropping and cutting. But the cost of material is comparatively high and it is not easy to produce so the integrative gear structure started from the end of jaw will obviously increase costs and it acts against economic benefits.

Therefore, aiming at the problems existing in the prior gear-drive shear, it is a requirement in the industry to improve a more practical and effective new structure.

BRIEF SUMMARY OF THE INVENTION

The benefits of the invention are as follows:

1. It provides a structure of gear-drive shear with an added curved plate on one side of the movable jaw, which is the first invention of the kind in the industry and meets the new-model patent requirement of novelty.

2. Mainly with the added curved plate, the opening and closing of the movable jaw is more flexible and intensive, and therefore result in a supplementary interplay to facilitate the user to use them more practically and effectively with less labor in operation. It meets the new-model patent requirement of advancement.

Also, with the added curved plate, the tooth edge of the movable jaw will be installed on the curved plate and change the previously integrality of the tooth edge. Because the curved plate is suitable to be made of flexible materials, it is easier to process the tooth edge. While the movable jaw which must be made of hard steel can also omit the tooth edge so as to simplify the structure and decrease the processing difficulty. As for the industry, it can therefore reduce production costs and produce better products.

DETAILED DESCRIPTION OF THE INVENTION

Figure 1:
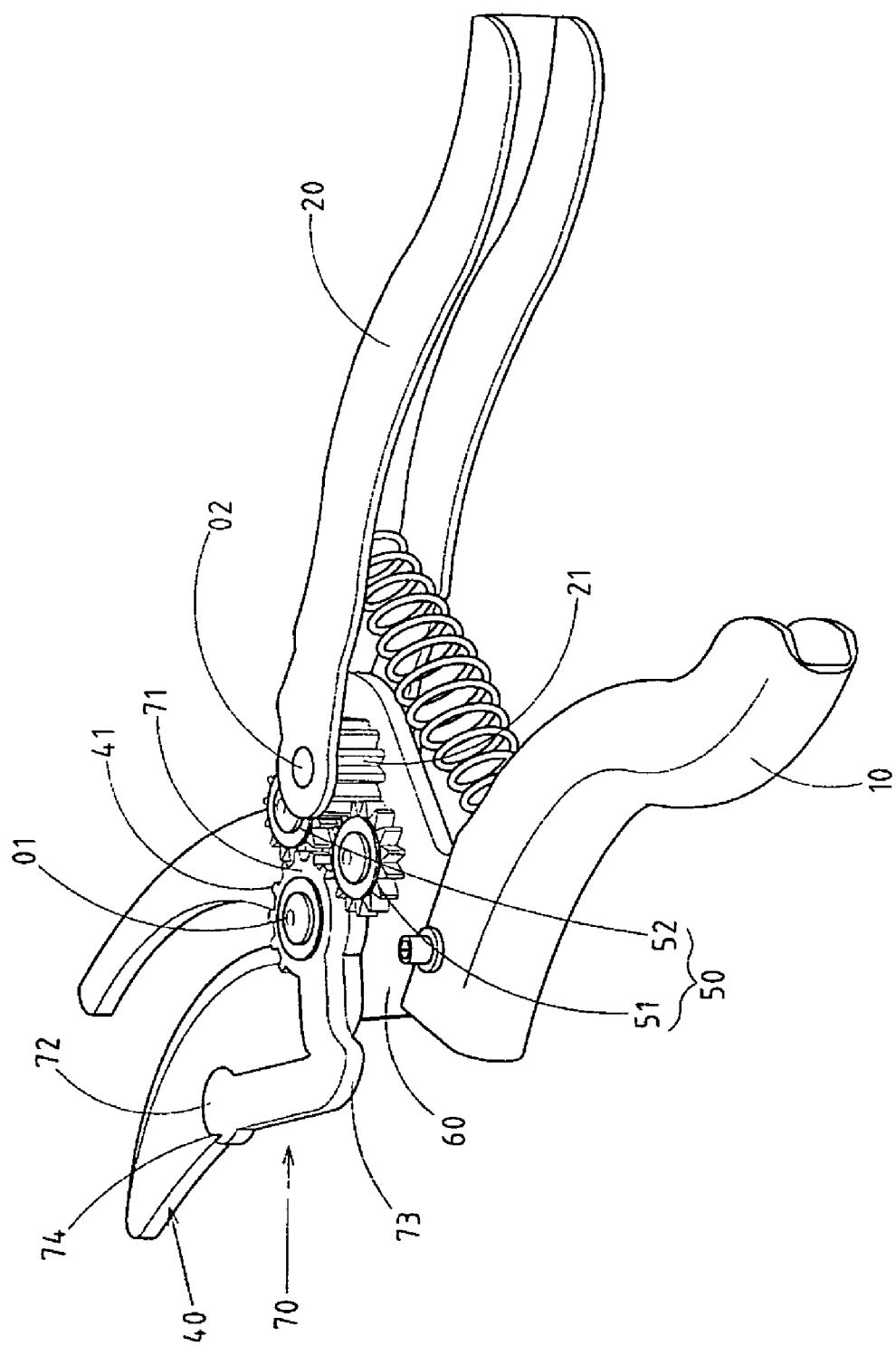
FIG. 1 shows a perspective view of the present invention.
Figure 2:
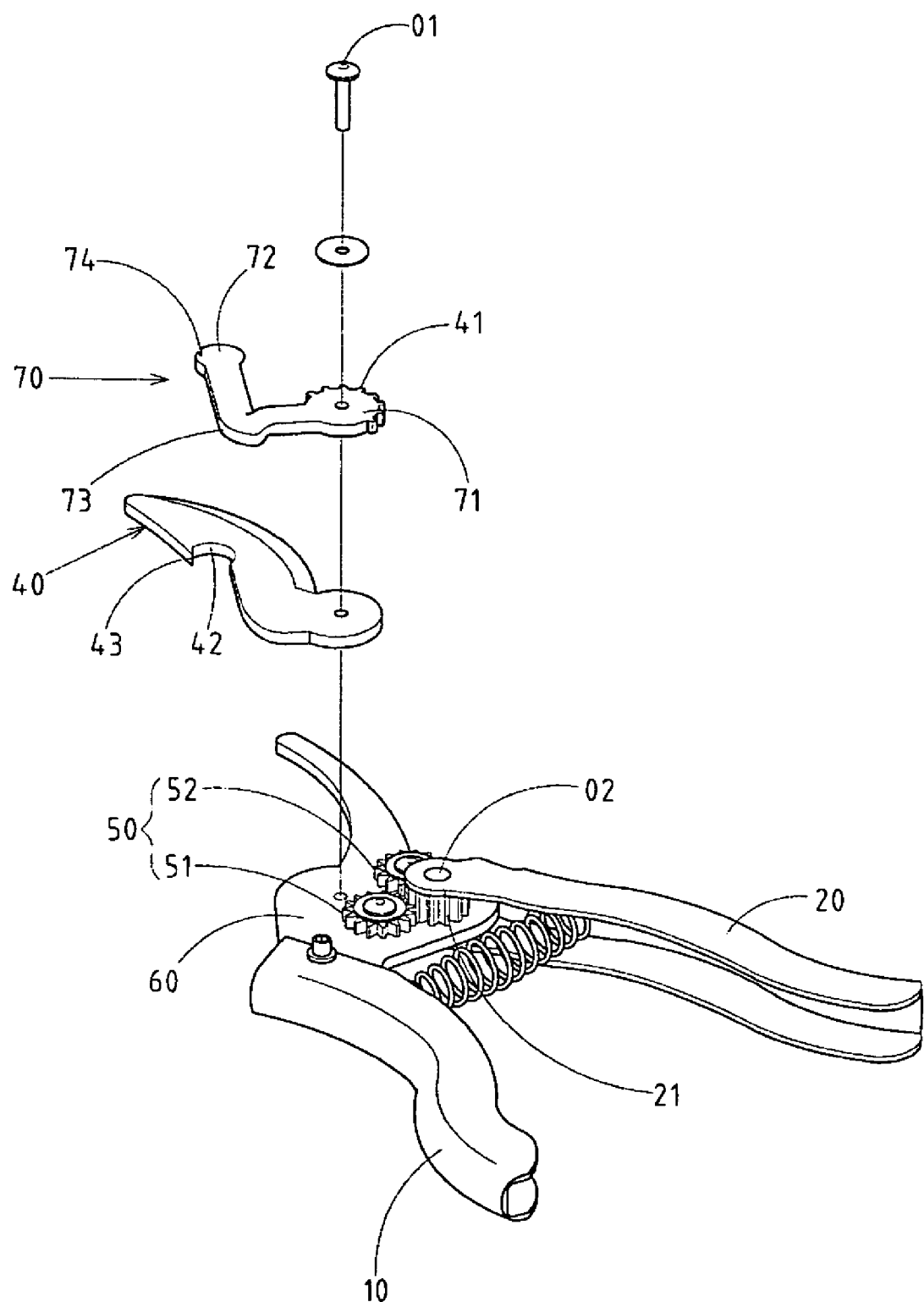
FIG. 2 shows an exploded perspective view of the present invention.
Figure 3:
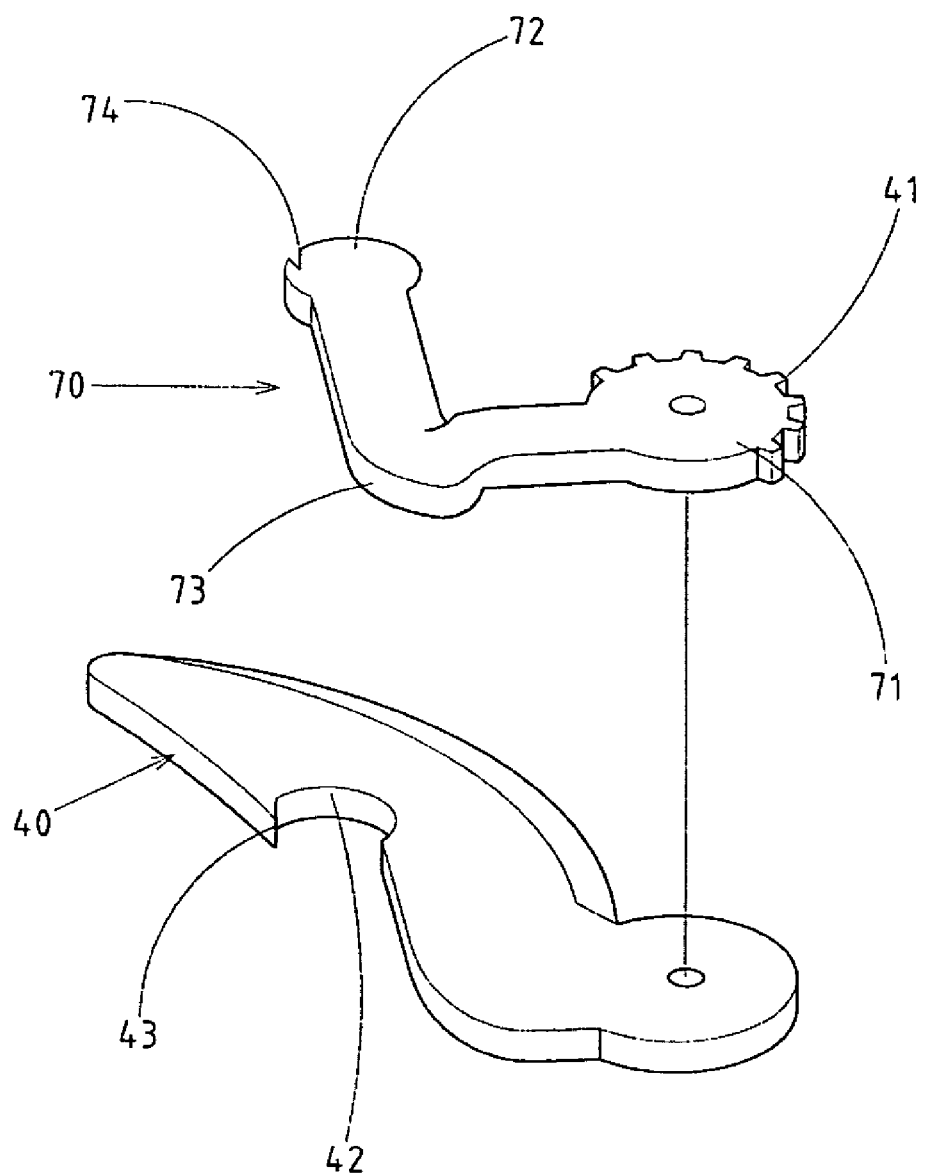
FIG. 3 shows a partial close-up perspective view of the example in FIG. 2.

As shown in FIGS. 1–4, there is a gear-drive shear embodied in the present invention.

The present invention includes a first grip 10, second grip 20, fixed jaw, movable jaw 40 and gear wheel module 50, among which, the fixed jaw and the first grip are connected together at a joint of plate assembly module 60 in the shape of an ampliative plate. The corresponding ends of the movable jaw 40 and the second grip 20 are installed slanting on the plate assemble module 60 respectively to the corresponding first pivot axle 01 and second pivot axle 02. The corresponding ends of the movable jaw 40 and the second grip 20 are equipped with tooth edges 41, 21 respectively. The gear wheel module 50 consists of the first gear wheel 51 and the second gear wheel 52. These two groups of gears are installed between the corresponding ends of the movable jaw 40 and the second grip 20 on the plate assembly module 60, among which, the same sides of these two groups of gears 51, 52 jointly mesh with the tooth edge 21 of the second grip 20, while the other side of the second gear wheel 52 meshes with the tooth edge 41 of the movable jaw 40.

One side of the movable jaw 40 is additionally equipped with a curved plate 70. One end of the curved plate 70 is also installed on the first pivot axle 01 of the plate assembly module sharing the same rotating point with the movable jaw 40. Meanwhile the movable jaw 40 is installed on the first edge 71 of the curved plate 70 together with the first tooth edge 41 of the curved plate 70 mentioned above. The second edge of the curved plate 70 is equipped with wedge 72, which is locked in the notch 42 on one side of the movable jaw 40. Moreover, the middle section 73 of curved plate 70 is made into a curve, such as in the shape of "(" shown in the annex or in the shape of arc.

The wedge 72 of the curved plate 70 can be made round and formed an edge notch 74 so as to set up a round notch cooperated with the notch 42 of the movable jaw 40. One side of the notch 42 is set up to be a flange 43 to mesh with the edge notch 74 mentioned above.

Figure 4:
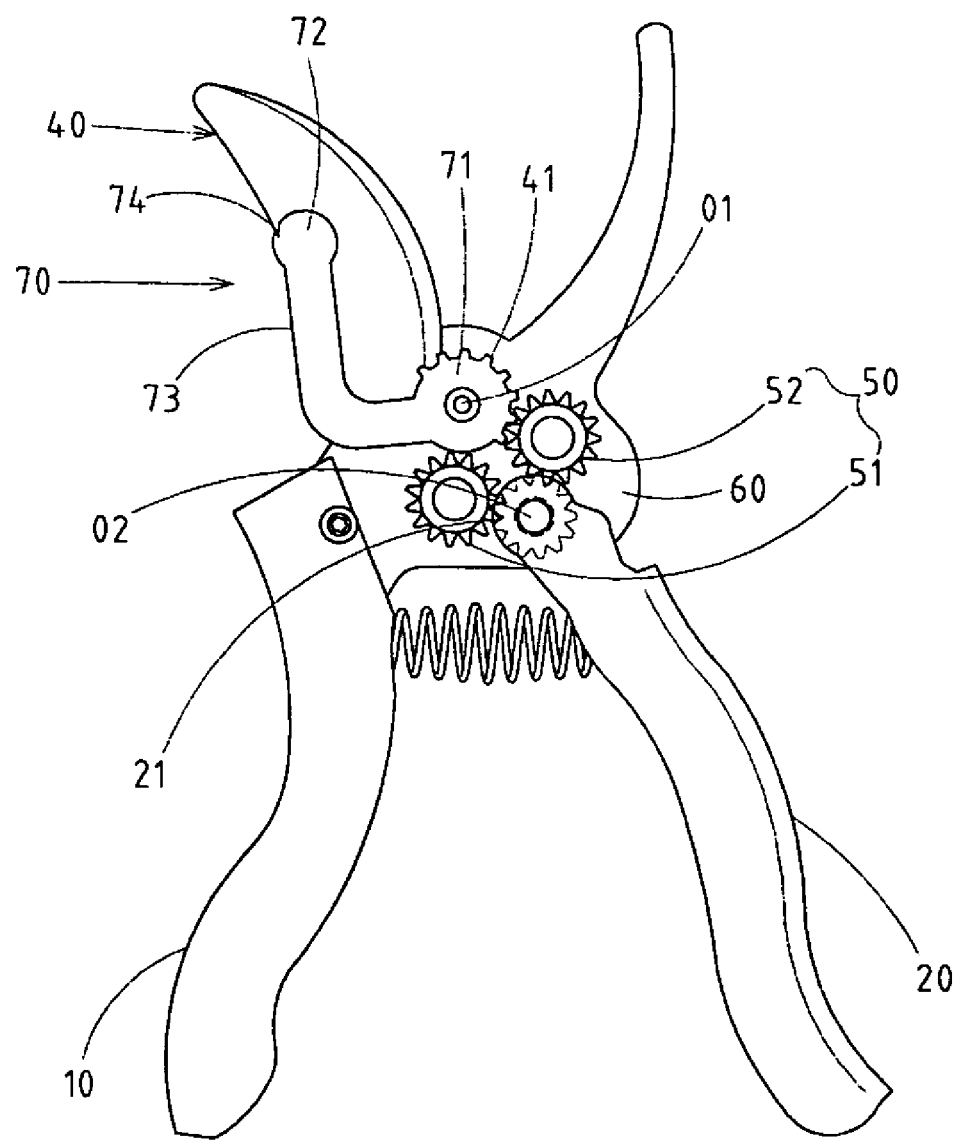
FIG. 4 shows a perspective view of the opening of the grip.
Figure 5:
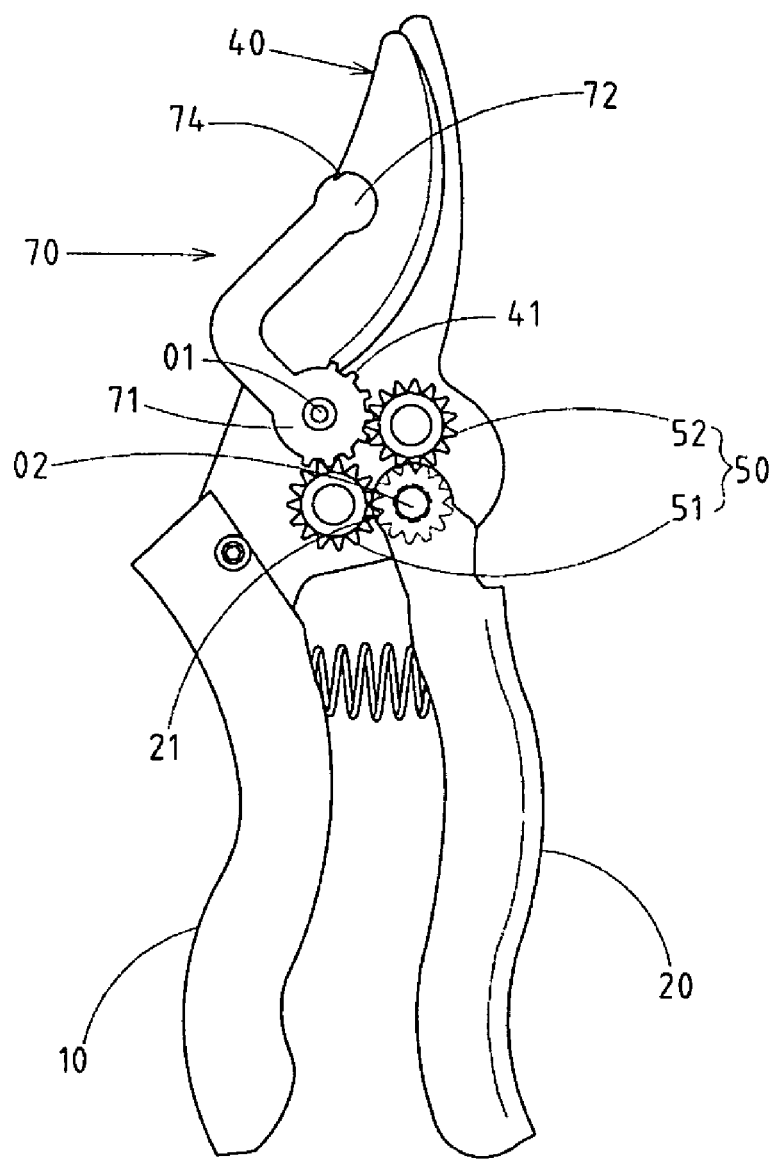
FIG. 5 shows a perspective view of the closing of the grip.

With the structure mentioned above, the opening and closing of the invention, the gear-drive shear is shown in FIGS. 4–5. When the second grip 20 is rotating, the first gear wheel 51 and the second gear wheel 52 will mesh at the same time. Then the second gear wheel 52 may mesh with the tooth edge 41 of the curved plate 70 subsequently. Therefore, the opening and closing of the wedge 72 and notch 42 will synchronously motivate the opening and closing of the movable jaw 40.

The features and the advantages of the present invention will be more readily understood upon a thoughtful deliberation of the following detailed description of a preferred embodiment of the present invention with reference to the accompanying drawings.

I claim:

1. A gear-driven shear comprising:
   a first grip;
   a second grip;
   a fixed jaw, connected with the first grip with a plate assemble module at a joint;
   a first pivot axle and a second pivot axle being installed slanting on the plate assemble module; wherein said second pivot axle is for assembling with the second grip;
   a movable jaw, assembled on the first pivot axle of the plate assembly module;
   a gear wheel module, comprised of a first gear wheel and a second gear wheel; wherein the gear wheels are installed between corresponding ends of the movable jaw and the second grip on the plate assembly module respectively, among which, one side of the second gear wheel meshes with a tooth edge of a curved plate;
   the curved plate, installed on one side of the movable jaw, wherein one end of the curved plate is also installed on the first pivot axle of the plate assembly module sharing the same rotating point with the movable jaw; and wherein a first edge of the curved plate is set installed with the tooth edge and mesh with the second gear wheel mentioned above; and wherein a second edge of the curved plate is equipped with a wedge, which is locked in a notch on one side of the movable jaw; and wherein a middle section of said curved plate is made into a curve.

2. The gear-driven shear defined in claim 1, wherein said wedge of the curved plate can be made round and formed an edge notch so as to set up a round notch cooperated with a notch of the movable jaw; and wherein one side of the notch of the movable jaw is set up to be a flange to mesh with said edge notch.

3. The gear-drive shear defined in claim 1, wherein said middle section of the curved plate can be made in the shape of "(".

* * * * *